(No Model.)

J. GELVIN.
VEHICLE SPRING.

No. 302,997. Patented Aug. 5, 1884.

WITNESSES
Phil C. Dieterich.
W. R. Keyworth.

INVENTOR
John Gelvin
by
W. Alexander
Attorney

UNITED STATES PATENT OFFICE.

JOHN GELVIN, OF MERCER, PENNSYLVANIA.

VEHICLE-SPRING.

SPECIFICATION forming part of Letters Patent No. 302,997, dated August 5, 1884.

Application filed December 6, 1883. (No model.)

*To all whom it may concern:*

Be it known that I, JOHN GELVIN, of Mercer, in the county of Mercer and State of Pennsylvania, have invented certain new and useful Improvements in Running-Gear for Buggies, &c.; and I do hereby declare that the following is a full, clear, and exact description thereof, reference being had to the accompanying drawings, and to the letters of reference marked thereon, which form part of this specification.

This invention relates to running-gear for buggies and other vehicles; and it has for its object to produce a device which shall possess superior advantages in point of simplicity, durability, and general efficiency.

To this end it consists in the improved construction and combination of parts, which will be hereinafter fully described, and particularly pointed out in the claims.

Figure 1:
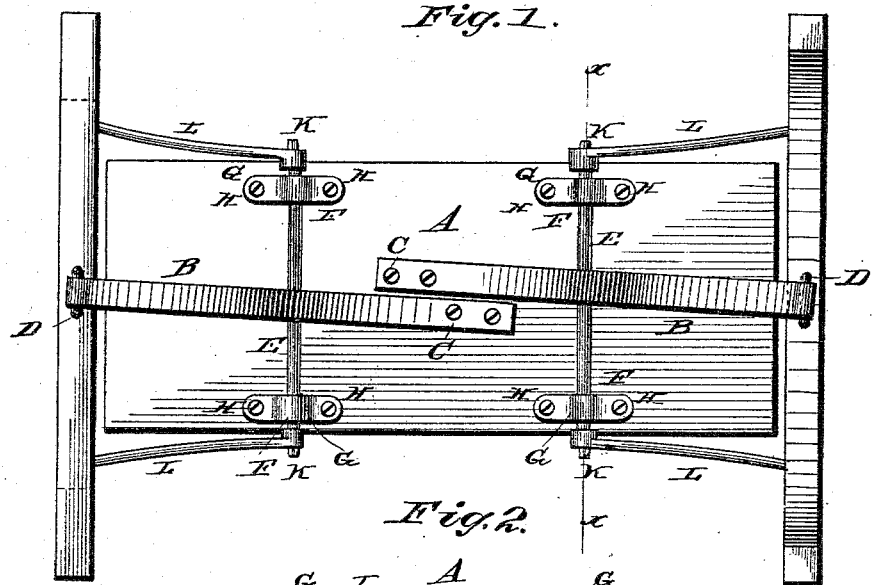
Figure 2:
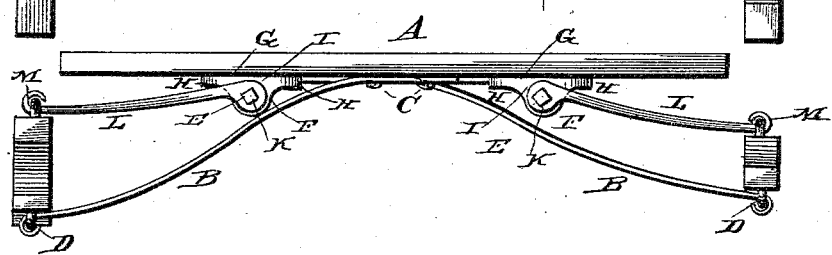
Figure 3:
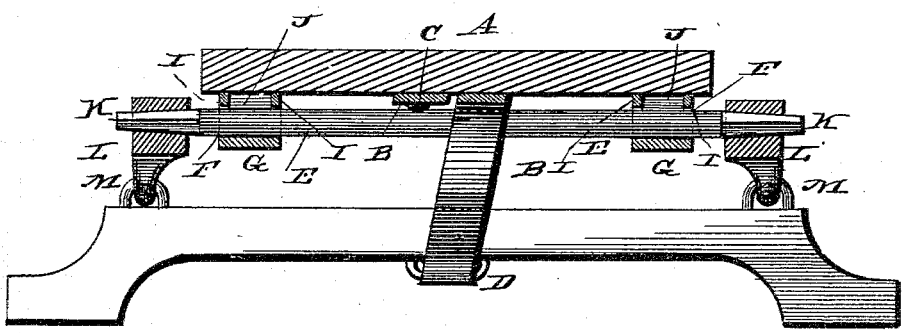

In the drawings hereto annexed, Figure 1 is a bottom view of a vehicle-body equipped with my improved gear. Fig. 2 is a side view of the same, and Fig. 3 is a vertical transverse sectional view on the line $x\ x$ in Fig. 1.

The same letters refer to the same parts in all the figures.

A designates the vehicle-body, and B B are the springs, which are arranged longitudinally and somewhat diagonally under the same, the inner ends of said springs being secured centrally under the said body in such position that the ends shall pass or overlap each other by means of screws, bolts, or other fastenings, C C, and their outer ends being connected to the front and rear axles, respectively, by the shackles D.

E E' are a pair of shafts arranged or journaled transversely under the vehicle-body A in suitable boxes or bearings, F, which are bolted or otherwise secured under the said vehicle-body. The said boxes consist of plates G, having eyes or bearings H, in the side walls of which I form chambers J, directly above the bearings of the shafts E. In these chambers packing or lubricating material may be placed, which will tend to reduce the friction and prevent unnecessary and unprofitable wear. The shafts E E' have polygonal ends K K, on which are placed arms or levers L L, the ends of which are connected, respectively, to the front bolster and the rear axle by means of shackles M. This mode of connection insures freedom of motion vertically, and at the same time such rigidity as will prevent any lateral or swaying motion of the vehicle-body, when moving rapidly or over rough roads, is attained.

The operation and advantages of this invention will be readily understood from the foregoing description, taken in connection with the drawings hereto annexed. When a weight or load is placed upon a vehicle equipped with this invention, the springs are depressed or extended, thus tending to spread the front and rear axles apart from each other; but said axles, being connected pivotally with the underside of the vehicle-body by the levers L and shafts E, are firmly braced, thus strengthening or re-enforcing the springs and insuring the requisite stiffness and rigidity, and also preventing lateral or swaying motion, which is an objectionable feature possessed by most light vehicles.

The construction is simple and inexpensive and the improvement may be readily applied to vehicles of ordinary construction.

The construction herein described is that which at the present time I consider preferable. I would have it understood, however, that various modifications in the construction of details may be resorted to without departing from the spirit of my invention, and I reserve to myself the privilege of making any such modifications.

I claim and desire to secure by Letters Patent of the United States—

1. The combination of a vehicle-body, springs connecting the under side of the same with the axles, shafts journaled transversely under said body, arms or levers connecting said shafts with the front bolster and rear axle, respectively, and boxes or bearings for the said transverse shafts, comprising the fastening-plates, and the eyes having side walls that form packing-chambers directly above the bearings of the shafts, substantially as set forth.

2. The combination of the vehicle-body, springs secured under the same diagonally, and their inner ends passing or overlapping each other, shackles connecting the outer ends of said springs to the axles, shafts journaled transversely under the vehicle-body, and having projecting polygonal ends, and levers mounted upon the polygonal ends of the said
5 shafts, and having their outer ends connected pivotally with the front bolster and the rear axle, respectively, as set forth.

In testimony that I claim the foregoing as my own I affix my signature in presence of two witnesses.

JOHN GELVIN.

Witnesses:
W. H. COCHRAN,
JOHN C. MILLER.